United States Patent
Roselier et al.

(10) Patent No.: US 9,086,728 B2
(45) Date of Patent: Jul. 21, 2015

(54) FLUIDIC ACTUATOR AND DISPLAY DEVICE HAVING FLUIDIC ACTUATORS

(75) Inventors: Samuel Roselier, Le Rheu (FR); Gwenael Changeon, Paris (FR); Jose Lozada, Massy (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 189 days.

(21) Appl. No.: 13/521,958

(22) PCT Filed: Dec. 14, 2010

(86) PCT No.: PCT/FR2010/052731
§ 371 (c)(1),
(2), (4) Date: Jul. 12, 2012

(87) PCT Pub. No.: WO2011/086257
PCT Pub. Date: Jul. 21, 2011

(65) Prior Publication Data
US 2012/0299905 A1 Nov. 29, 2012

(30) Foreign Application Priority Data
Jan. 18, 2010 (FR) ..................... 10 50296

(51) Int. Cl.
G09G 5/00 (2006.01)
G06F 3/01 (2006.01)
F15B 15/00 (2006.01)
F15B 21/06 (2006.01)
(Continued)

(52) U.S. Cl.
CPC .............. *G06F 3/016* (2013.01); *F15B 15/00* (2013.01); *F15B 21/065* (2013.01); *G09B 21/003* (2013.01); *F15B 2015/208* (2013.01)

(58) Field of Classification Search
CPC ................. G09G 3/3486; G09G 2300/0819; G09G 2300/0842; G09G 2300/0852; G09G 2320/043; F15B 15/00; F15B 15/065
USPC .............. 345/60, 156, 204–214; 137/13, 807; 269/289; 415/140
See application file for complete search history.

(56) References Cited

U.S. PATENT DOCUMENTS 5,667,715 A * 9/1997 Foister .................. 252/62.52
5,705,085 A * 1/1998 Munoz et al. .............. 252/62.52
5,949,050 A * 9/1999 Fosbenner et al. ............ 235/449
(Continued)

FOREIGN PATENT DOCUMENTS

EP 1 835 380 9/2007

OTHER PUBLICATIONS

Ouellette, J., "Smart Fluids Move into the Marketplace," The Industrial Physicist, pp. 14 to 17, (Dec. 2003).
(Continued)

*Primary Examiner* — Prabodh M Dharia
(74) *Attorney, Agent, or Firm* — Oblon, McClelland, Maier & Neustadt, L.L.P.

(57) ABSTRACT

A fluidic actuator includes a chamber filled with a fluid, an element movable in relation to the chamber and in contact with the fluid, as well as a passage for circulating the fluid between the inside and the outside of the chamber in order to vary the amount of fluid in the chamber, thus causing movement of the movable element. The fluid is magnetorheological and the fluidic actuator includes a magnetic field generator arranged so as to generate, in the passage, a controlled magnetic field.

10 Claims, 5 Drawing Sheets

Figure 1:
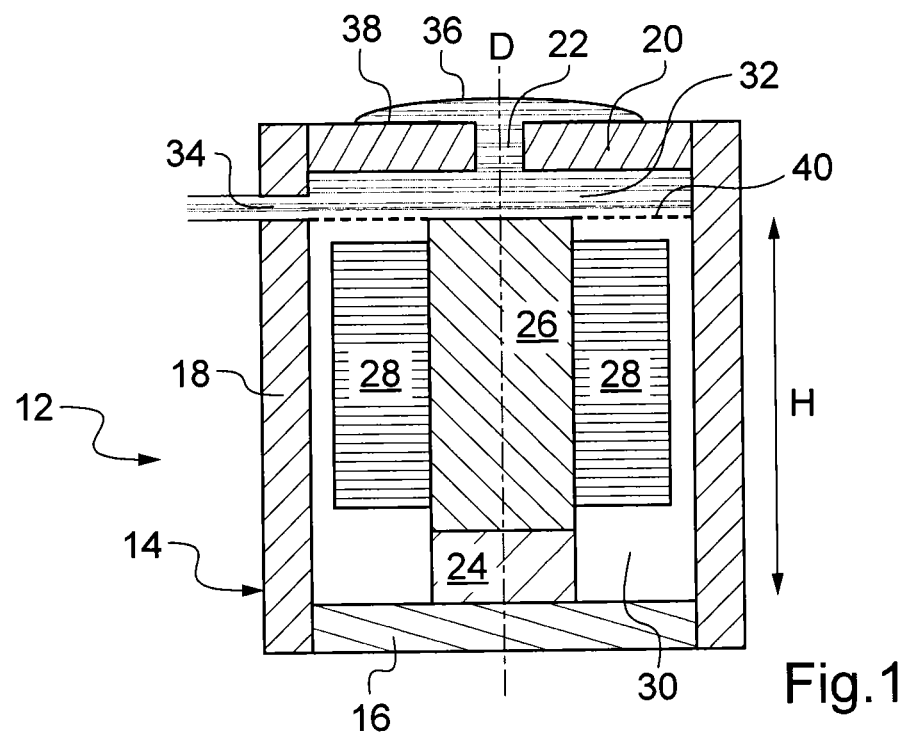

(51) Int. Cl.
*G09B 21/00* (2006.01)
*F15B 15/20* (2006.01)

(56) References Cited

U.S. PATENT DOCUMENTS

| | | | |
|---|---|---|---|
| 6,373,465 B2 * | 4/2002 | Jolly et al. | 345/156 |
| 7,258,418 B2 * | 8/2007 | Silverbrook | 347/29 |
| 8,016,026 B2 * | 9/2011 | Joseph | 166/66.5 |
| 8,215,463 B2 * | 7/2012 | Kondo et al. | 188/267.2 |
| 8,475,145 B2 * | 7/2013 | Den Toonder et al. | 417/423.1 |
| 2001/0052893 A1 * | 12/2001 | Jolly et al. | 345/156 |
| 2003/0166470 A1 * | 9/2003 | Fripp et al. | 507/100 |
| 2004/0085294 A1 * | 5/2004 | Michelitsch et al. | 345/156 |
| 2005/0200067 A1 * | 9/2005 | Browne et al. | 269/289 R |
| 2007/0013655 A1 * | 1/2007 | Rosenberg et al. | 345/156 |
| 2007/0211032 A1 | 9/2007 | Ahn et al. | |
| 2008/0170936 A1 * | 7/2008 | Den Toonder et al. | 415/140 |
| 2009/0183199 A1 * | 7/2009 | Stafford et al. | 725/34 |
| 2009/0200126 A1 * | 8/2009 | Kondo et al. | 188/267.1 |
| 2009/0250267 A1 * | 10/2009 | Heubel et al. | 178/18.03 |
| 2009/0304909 A1 * | 12/2009 | Daniels | 427/66 |
| 2010/0302199 A1 * | 12/2010 | Taylor et al. | 345/174 |
| 2011/0032187 A1 * | 2/2011 | Kramer et al. | 345/163 |
| 2011/0148794 A1 * | 6/2011 | Cunningham et al. | 345/173 |
| 2012/0189795 A1 * | 7/2012 | Wong | 428/36.91 |

OTHER PUBLICATIONS

French Search Report Issued Sep. 2, 2010 in FR 1050296 Filed Jan. 18, 2010.

International Search Report Issued Jun. 18, 2012 in PCT/FR10/52731 Filed Dec. 14, 2010.

* cited by examiner

FLUIDIC ACTUATOR AND DISPLAY DEVICE HAVING FLUIDIC ACTUATORS

The present invention relates to a fluidic actuator. It also relates to a display device comprising a plurality of fluidic actuators.

More specifically, the invention relates to a fluidic actuator comprising a chamber filled with a fluid, an element that is movable with respect to the chamber and in contact with the fluid, as well as a passage for circulating the fluid between the inside and the outside of the chamber for varying the quantity of fluid in the chamber, thus causing movement of the movable element.

Such a fluidic actuator is used, particularly, in bidimensional display devices having a deformable screen such as that described in the patent published under number U.S. Pat. No. 5,222,895. The mechanism implemented in this document is based on the electrorheological properties of the fluid used. A fluidic valve is formed by arranging electrodes around a passage for circulating the fluid, closing the passage by increasing the apparent viscosity of the fluid when these electrodes are supplied with sufficient current. Thus, by opening or closing the passage, movement of the movable element is either enabled or blocked in order to change or maintain a deformation state of the display screen.

This technology requires the application of significant voltage to the electrodes when the closing of the passage is desired, i.e., when one wishes to maintain a certain deformation state of the display screen. It therefore becomes necessary, for safety reasons, to provide good electrical insulation between the inside of the actuator and the outside surface of the display device. Finally, it should be noted that the application of voltage to the electrodes must be maintained as long as one wishes to block the passage, that is, as long as one wishes to maintain the fluidic valve in the closed position, which involves some power consumption.

A fluidic actuator using the same technology is also described in the patent published under number U.S. Pat. No. 5,496,174.

This type of actuator can particularly be used for designing a display device having a deformable surface, such as, for example, a screen for displaying information for blind people in Braille or the like, a plurality of actuators being distributed over the surface of the display screen in that case. Different shapes can thus be displayed on the screen in a reconfigurable manner.

The implementation of this type of screen requires low-cost actuators and simple assembly processes in order to keep the manufacturing cost reasonable. Indeed, a tactile interface measuring 32 cm×24 cm and having a resolution of 1 mm has 76800 actuators to be actuated independently or in groups. Moreover, several actuators may need to be actuated simultaneously, which raises power consumption issues. Using the technology proposed in the documents cited above, the power consumption is not optimized.

Other technologies can be envisaged for the manufacture of actuators to be integrated into a display device having a deformable surface, but they generally do not contribute a satisfactory solution in terms of the complexity of the structure, electrical power consumption, or both. For instance, pneumatic actuators are known, but the design of the valves and the connector technology are complex. Bimetallic piezoelectric actuators are also known, but these are very expensive. They are also very bulky. Solutions are also known which are based on shape-memory alloy wires, but actuation is achieved by means of thermal transfer and the wire must be maintained at a predetermined temperature, which consumes a lot of energy. The same applies to solutions which use the thermal expansion of materials to make a cavity swell: a certain temperature must be maintained in the cavity. Moreover, the response time of each actuator depends on the cooling time of the active elements, which limits the dynamic performance of the system considerably.

It may therefore be desired to provide a fluidic actuator which makes it possible to avoid at least some of the above-mentioned problems and constraints.

It is therefore an object of the invention to provide a fluidic actuator comprising a chamber filled with a fluid, an element that is movable with respect to the chamber and in contact with the fluid, a passage for circulating the fluid between the inside and the outside of the chamber for varying the quantity of fluid in the chamber, thus causing movement of the movable element, wherein the fluid is magnetorheological and wherein the fluidic actuator comprises magnetic field generation means arranged so as to produce a controlled magnetic field in the passage.

A magnetorheological fluid comprises ferromagnetic particles suspended in a liquid solvent. Under the influence of a magnetic field, these particles form chains having break resistance proportional to the intensity of the field. The apparent viscosity of the magnetorheological fluid is modified in this way. The flow of the fluid can then be controlled in the passage in which a magnetic field is generated.

The design of such an actuator is very simple and requires few moving mechanical parts, which enables a robust mechanism to be obtained. Moreover, a voltage lower than that of the electrorheological fluids is sufficient. Finally, the problem of electrical insulation between the inside of the actuator and the outside surface of the device is less sensitive in the presence of a magnetic field than when an electrical field is generated.

Optionally, a fluidic actuator according to the invention, wherein the means of magnetic field generation comprise an electromagnet, may comprise an electric power supply device for the electromagnet designed to:

temporarily provide, to a coil of the electromagnet, an electrical current of sufficient intensity to produce a magnetic field for saturation of magnetizable elements of the actuator, generating a residual remanent magnetic field which remains after application of the electrical current and the intensity of which is sufficient to keep the passage closed by acting on the viscosity of the magnetorheological fluid located in the passage, temporarily provide, to the coil of the electromagnet, a coercive excitation for the demagnetization of the magnetizable elements of the actuator by cancelling the residual remanent magnetic field.

In this case, consumption of electrical power is only necessary at times in which one wishes to open and close the passage in order to cause movement of the movable element, which makes the actuator particularly energy efficient.

Also optionally, a fluidic actuator according to the invention may further comprise a permanent magnet that generates a permanent magnetic field in the passage the intensity of which is sufficient to keep the passage closed by acting on the viscosity of the magnetorheological fluid located in the passage, and the means of magnetic field generation can be configured such that the controlled magnetic field at least partially offsets the effect of the permanent magnetic field when they are activated.

In this case, consumption of power is only necessary at times in which one wishes to open the passage in order to cause movement of the movable element, which also makes the actuator particularly energy efficient.

Also optionally, a fluidic actuator according to the invention may comprise two electromagnets arranged on either side of the permanent magnet so as to channel, between the two electromagnets, the permanent magnetic field generated by the permanent magnet when the two electromagnets are supplied with electricity.

Also optionally, a fluidic actuator according to the invention may comprise a plate provided with a through conduit and forming one of the walls of the chamber, the movable element comprising a piston that can be moved in the conduit.

Also optionally, a fluidic actuator according to the invention may comprise a plate provided with a through conduit and forming one of the walls of the chamber, the movable element comprising a deformable membrane fixed hermetically to a surface of the plate facing away from the inside of the chamber, the membrane covering the conduit.

It is also an object of the invention to provide a display device having a deformable surface comprising a plurality of fluidic actuators as defined in the foregoing, the movable elements of which are distributed, particularly regularly in the manner of a matrix, on the deformable surface.

Optionally, a display device according to the invention may comprise a display screen comprising a plate, this plate being equipped with a plurality of through conduits opposite of which the chambers filled with magnetorheological fluid of the fluidic actuators are arranged.

Also optionally, a display device according to the invention may comprise a common network of channels for supplying the chambers of the fluidic actuators with magnetorheological fluid under adjustable pressure.

Also optionally, a display device according to the invention may comprise an electronic circuit for individually controlling each of the means of magnetic field generation of each fluidic actuator and for collectively controlling the pressure of the magnetorheological fluid in the channels of the common network.

Figure 4:
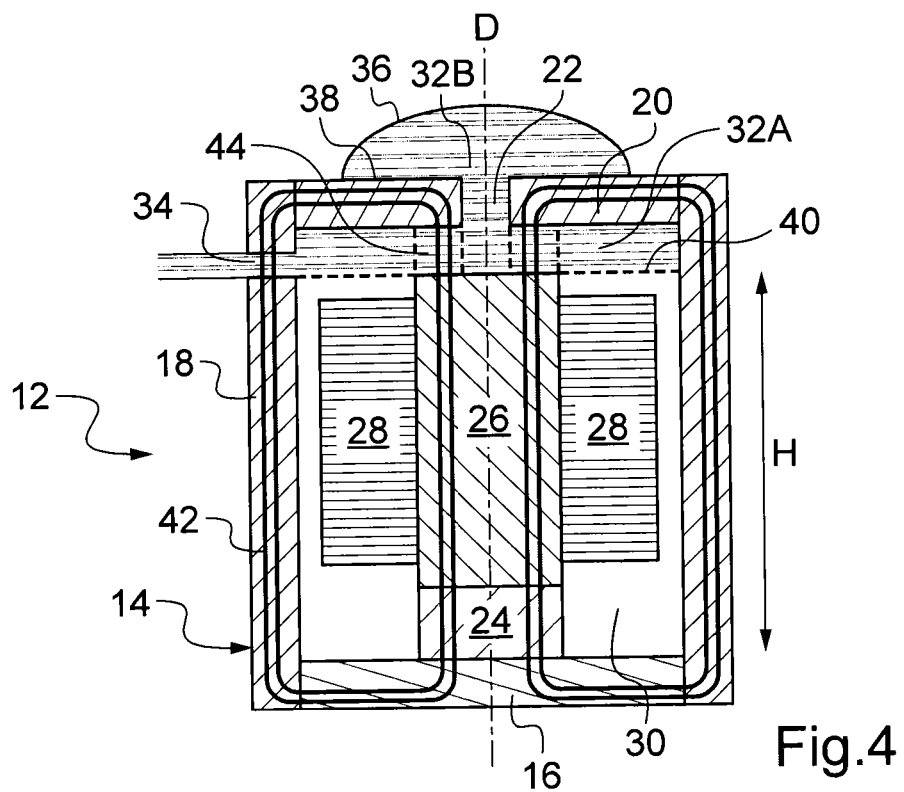
Figure 5:
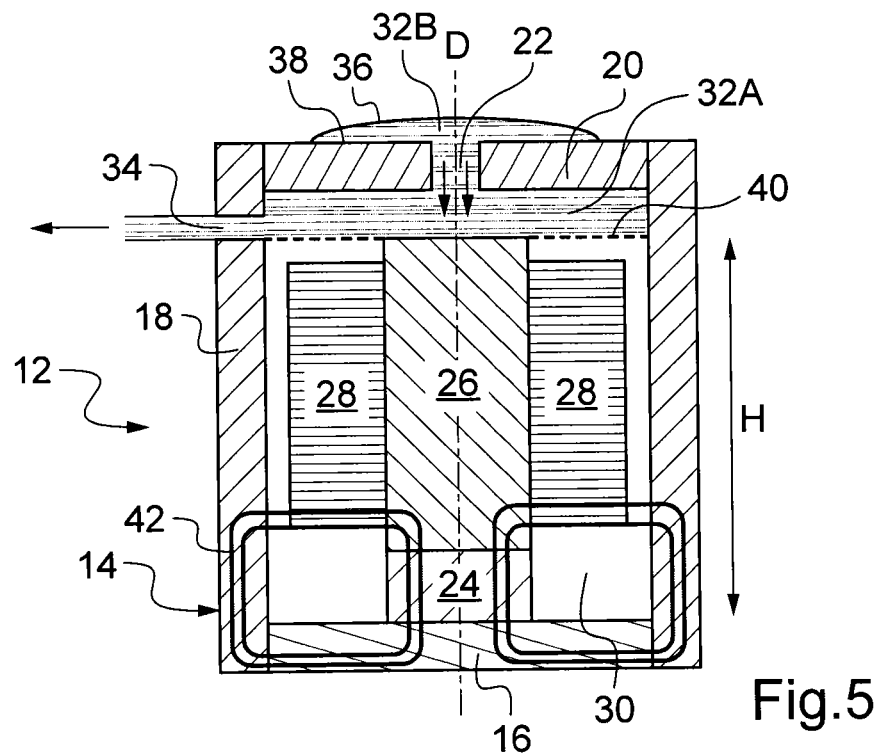
Figure 6:
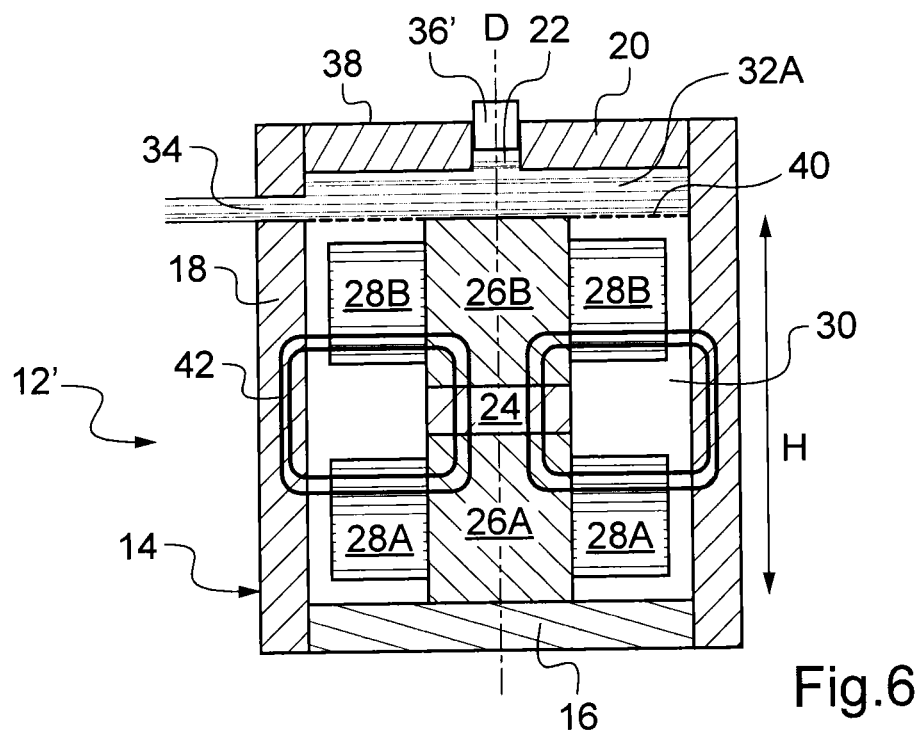
Figure 7:
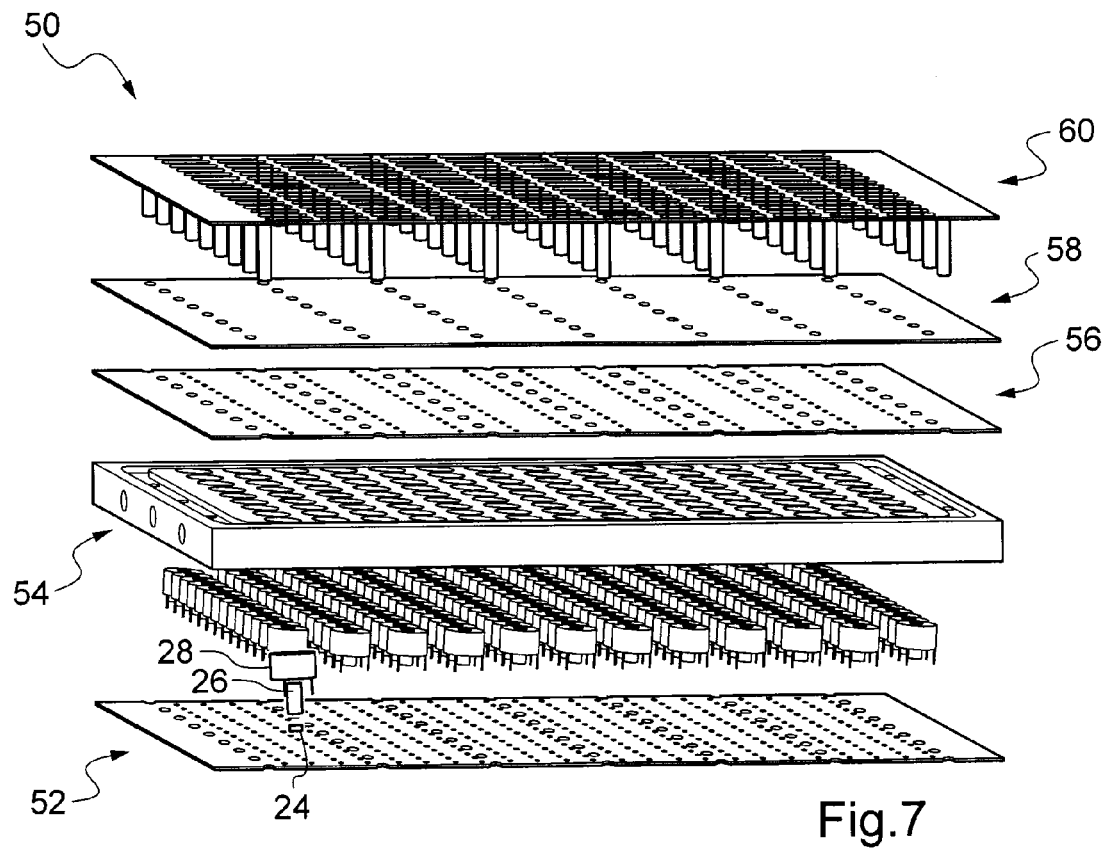
Figure 8:
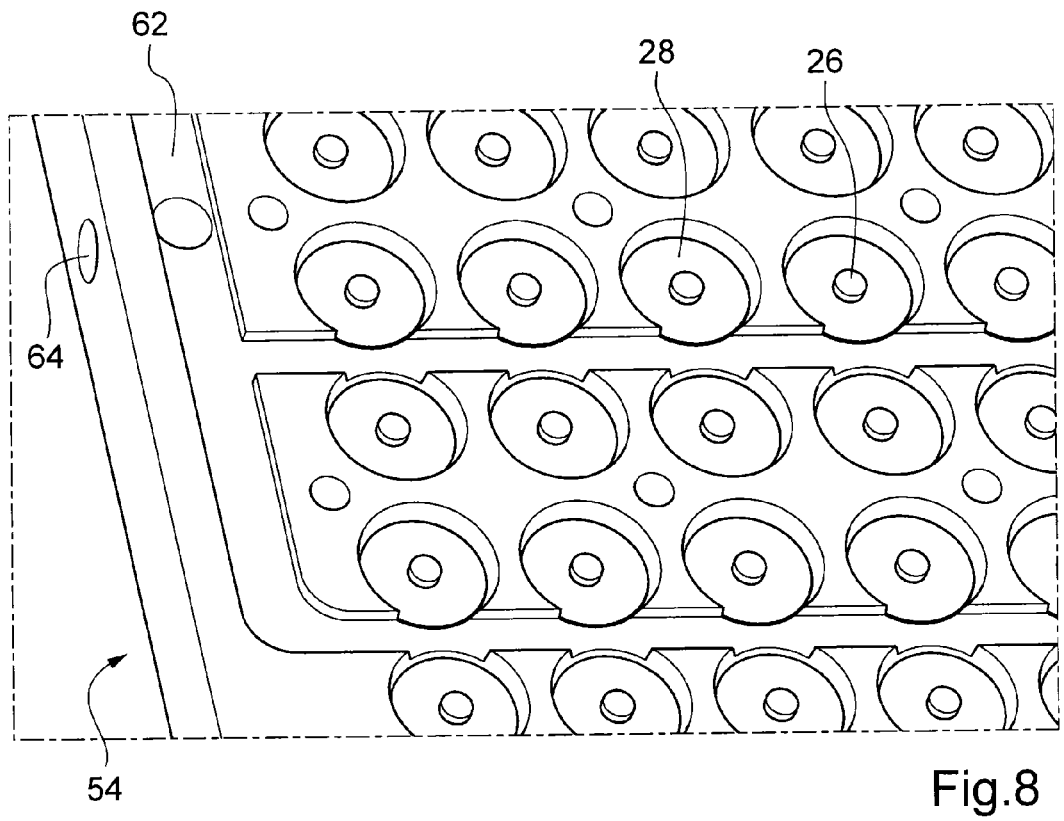
Figure 9:
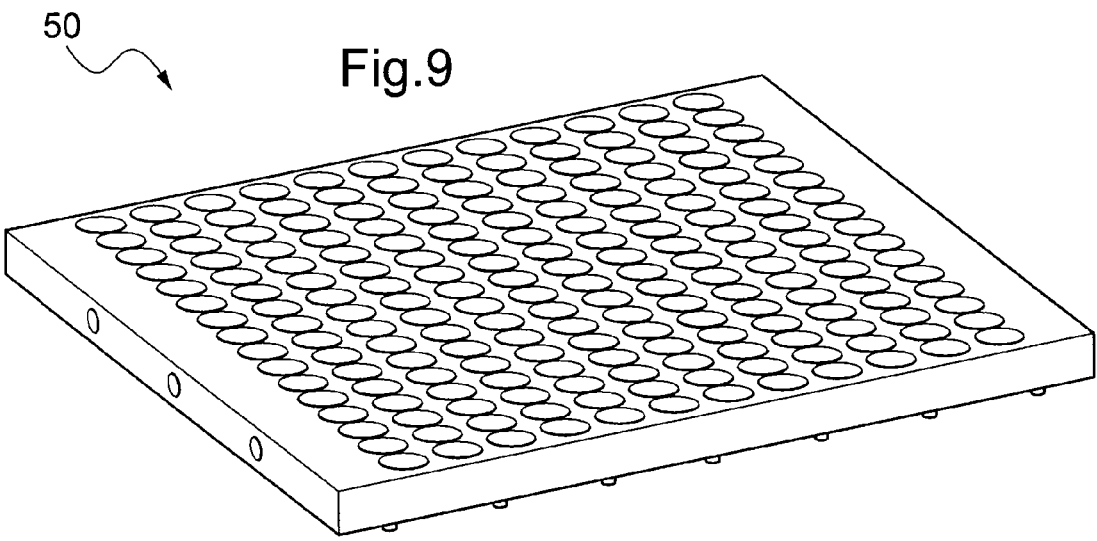
Figure 10:
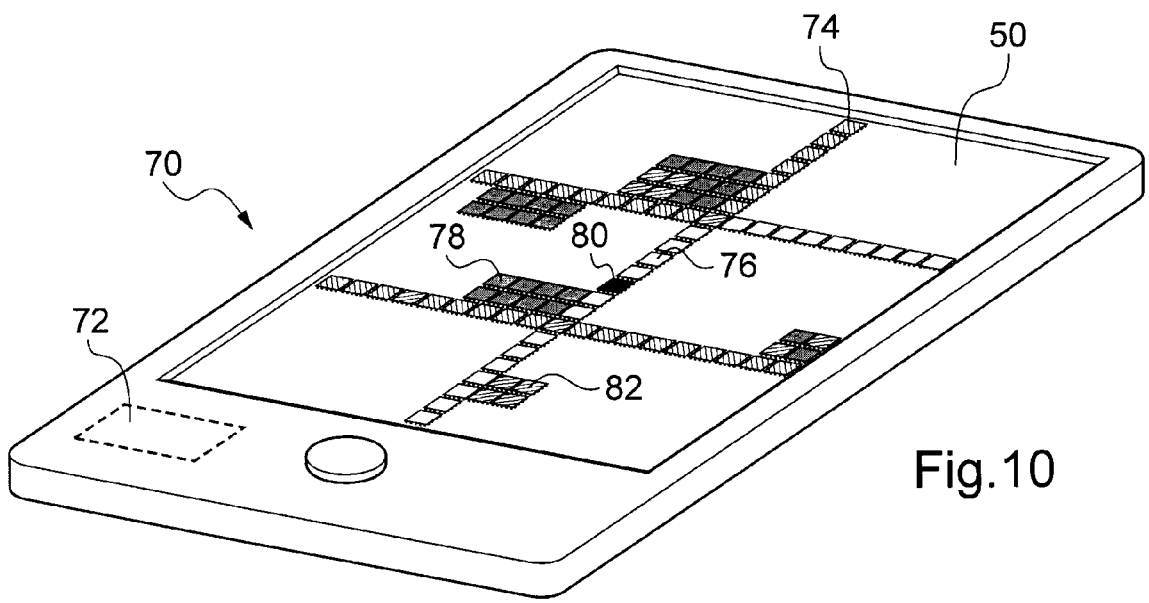

The invention will be better understood with the aid of the following description given solely for the sake of example with reference to the enclosed drawings, in which:

FIG. 1 shows a schematic representation of a fluidic actuator according to a first embodiment of the invention, FIGS. 2 to 5 show the fluidic actuator of FIG. 1 in several operational situations, FIG. 6 shows a schematic representation of a fluidic actuator according to a second embodiment of the invention, FIG. 7 shows a schematic, exploded perspective view of a display device having a deformable surface according to an embodiment of the invention, FIG. 8 shows detail of a part of the display device of FIG. 7, FIG. 9 shows a schematic perspective view of the display device of FIG. 7 when it is assembled, and FIG. 10 shows a schematic perspective view of a portable device equipped with a display device having a deformable surface according to an embodiment of the invention.

The fluidic actuator 12 shown in FIG. 1 comprises an enclosure 14 made of a material capable of guiding magnetic field lines, for example of iron or of steel or, more generally, a soft ferromagnetic material. This enclosure 14 comprises, for example, a solid circular base 16, a cylindrical side wall 18 and a solid circular upper plate 20 pierced by a through hole 22 centered on the longitudinal axis of symmetry D of the cylindrical side wall 18.

In one embodiment of the invention, a cylindrical permanent magnet 24 is arranged on the inside of the enclosure 14 on the base 16, centered about the axis D. The radius thereof is clearly less than the inside radius of the cylindrical side wall 18. Arranged on this permanent magnet 24 is a cylindrical central core 26 having the same radius, also centered about the axis D and extending along this axis up to a certain height H on the inside of the enclosure 14. This central core 26 is, for example, also made up of iron or steel, more generally of a soft ferromagnetic material, so as to guide the field lines in a direction parallel to the axis D.

Around the central core 26, a coil 28 extends between the outside surface of the central core and the inside surface of the side wall 18, but without reaching the latter. The coil 28 is composed of an electrically conductive wire wound around the central core 26 to form an electromagnet with same.

The permanent magnet 24 thus generates a first permanent magnetic field B1 the field lines of which can be guided by the central core 26, the upper plate 20, the side wall 18 and the base 16, whereas the electromagnet 26, 28 is capable of generating, by electrical control, a second controlled magnetic field B2 the field lines of which can also be guided by the central core 26, the upper plate 20, the side wall 18 and the base 16.

The height H which extends from the base 16 to the open upper surface of the central core 26 on the inside of the enclosure 14 describes a first interior volume 30 in which are located the permanent magnet 24, the central core 26 and the coil 28, filled with a dielectric medium. Beyond this height H, in a reserve 32 the volume of which is complementary to the first interior volume 30 in the overall volume of the enclosure 14, the reserve 32 is filled with a magnetorheological fluid.

The magnetorheological fluid is introduced into the reserve 32 under adjustable pressure through a conduit 34 passing through the side wall 18 beyond the height H. Finally, despite the presence of the through hole 22 in the upper plate 20, the reserve 32 is isolated from the outside of the enclosure 14 through the hermetic arrangement of a movable element on the through hole 22, this movable element thus being in contact with the magnetorheological fluid in the reserve 32.

More specifically, in the embodiment illustrated in FIG. 1, the movable element is a deformable membrane 36 fixed hermetically on the outside surface 38 of the upper plate 20 facing away from the inside of the enclosure 14. This deformable membrane 36 covers the through hole 22. It is, for example, a thin elastic membrane such as a nitrile membrane that is both flexible and resistant to the corrosion caused by the magnetorheological fluid.

The dielectric medium filling the first interior volume 30 of the enclosure 14 is, for example, a resin or a paste that engulfs the permanent magnet 24, the central core 26 and the coil 28. It can also simply be air, but in this case a rigid and hermetic partition 40 must be provided between the first interior volume 30 and the reserve 32. This partition 40 can be composed of a membrane made of plastic or aluminum, more generally a membrane made of a rigid material that does not conduct the magnetic field. The dielectric medium filling the first interior volume 30 can also be magnetorheological fluid. In this case, there is no partition between the reserve 32 and the first interior volume 30.

Figure 2:
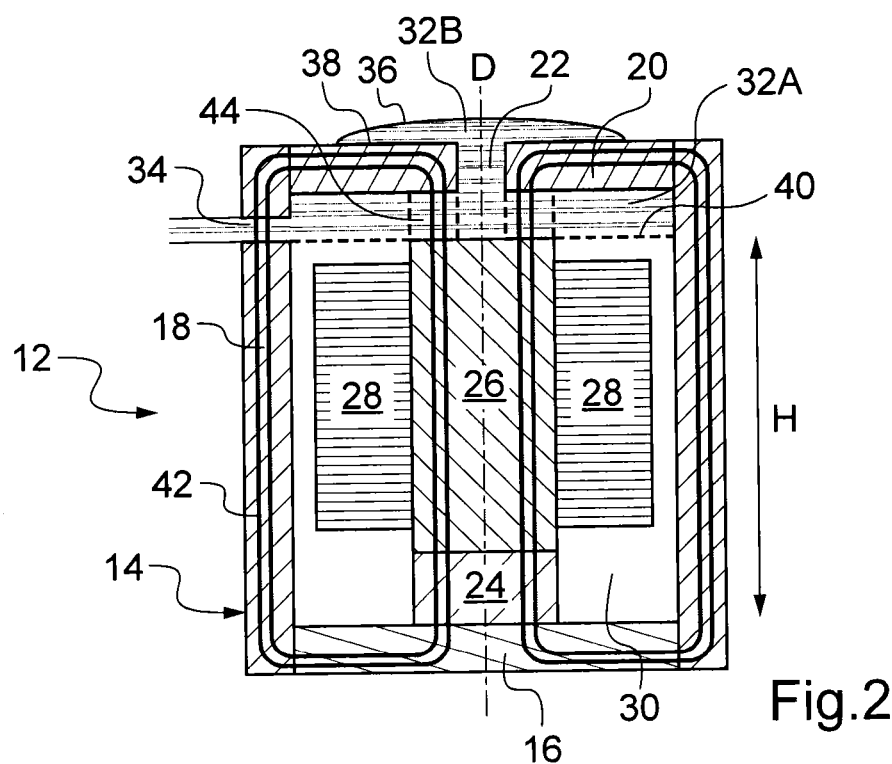

As is illustrated in FIG. 2, the field lines 42 generated by the field B1 or B2 are guided by the central core 26, the upper plate 20, the side wall 18 and the base 16. In this path of field lines, an annular air-gap 44 is described between the upper plate 20 and the upper surface of the central core 26, the radius of the through hole 22 being less than the radius of the central core 26.

This air-gap 44 constitutes a passage for circulating the magnetorheological fluid in the reserve 32, between a first chamber 32A for supplying fluid through the conduit 34 and a second chamber 32B for actuating the deformable membrane 36. The second chamber 32B is therefore delimited by the upper plate 20, the deformable membrane 36, the air-gap 44 and the upper surface of the central core 26. The magnetorheological fluid that it contains is in contact with the deformable membrane 36 and is therefore able to deform the latter more or less depending on the volume thereof. As will now be detailed with reference to FIG. 2, but also to FIGS. 3, 4 and 5, the fluid volume in the second chamber 32B can indeed be adjusted under the effect of the fields B1 and/or B2 and of the fluid supply pressure in the reserve 32 through the conduit 34.

In the embodiment illustrated in FIGS. 1 to 5, the presence of the permanent magnet 24 ensures by default the presence of a permanent field B1 of sufficient intensity to block the flow of magnetorheological fluid in the passage/air-gap 44.

Therefore, as illustrated in FIG. 2, during a first step, the fluid volume in the second chamber 32B is by default maintained constant such that the deformable membrane is maintained in a first position of constant deformation without consuming any electrical power.

Of course, the permanent magnet 24 is not essential for the implementation of the invention, since the blocking and unblocking of the passage 44 can be handled completely by the electromagnet 26, 28, but a substantial amount of electrical power is saved because it is only consumed when changes occur in the deformation of the deformable membrane 36.

Figure 3:
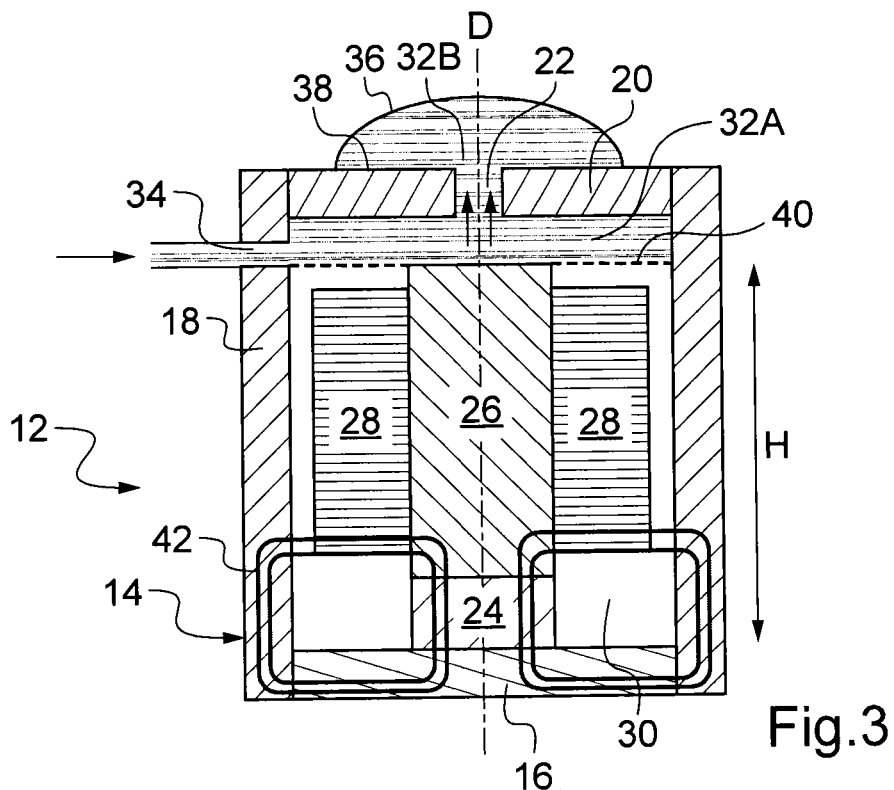

As illustrated in FIG. 3, during a second step, a pressure higher than the pressure in the second chamber 32B is applied at the input (i.e., at the conduit 34) of the first chamber 32A and an electric charge passes through the coil 28 so as to generate a controlled magnetic field B2 the effect of which offsets the effect of the permanent magnetic field B1 in the passage 44 at least partially, preferably totally. By virtue of the controlled magnetic field B2 offsetting the field B1, the passage 44 opens to the flow of magnetorheological fluid, and by virtue of the overpressure applied at the conduit 34, the flow goes from the first chamber 32A toward the second chamber 32B. As a result, the deformable membrane 36 deforms toward a second high position. Particularly, the magnetic field B2 causes the channeling of the field lines B1 between the base of the electromagnet 26, 28 and the base 16 of the enclosure 14.

As illustrated in FIG. 4, during a third step, the coil 28 is no longer supplied with current, so the passage 44 closes again. The deformable membrane 36 is thus maintained in its second high position without consumption of electricity.

Finally, as illustrated in FIG. 5, during a fourth step, a pressure lower than the pressure in the second chamber 32B is applied at the input (i.e., at the conduit 34) of the first chamber 32A and an electric charge is applied to the coil 28 so as to generate a controlled magnetic field B2 the effect of which offsets the effect of the permanent magnetic field B1 in the passage 44. By virtue of the controlled magnetic field B2 offsetting the field B1, the passage 44 opens again to the flow of magnetorheological fluid, and by virtue of the depression supplied at the conduit 34, the flow goes from the second chamber 32B toward the first chamber 32A. As a result, the deformable membrane 36 deforms toward its first position or toward a third low position. Again, during this step, the magnetic field B2 causes the channeling of the field lines B1 between the base of the electromagnet 26, 28 and the base 16 of the enclosure 14.

Sequentially, this fourth step can be executed in the following manner: the passage 44 is first open through offsetting of the magnetic field B1 by the magnetic field B2; then the pressure applied at the input 34 of the first chamber 32A is progressively lowered to reduce the deformation of the deformable membrane 36 in a regulated manner.

In the absence of a permanent magnet 24, as was pointed out previously, the blocking and unblocking of the passage 44 can be generated completely by the electromagnet 26, 28.

In this case, in order to avoid the necessity of constant consumption of electrical power as long as one wishes to keep the passage 44 closed, the following procedure, using the remanence properties of a magnetic field, can be used in order to close and then open the passage 44:

an electric current is applied temporarily to the coil 28 having sufficient intensity to generate a magnetic field for saturation of the magnetizable elements of the actuator, generating a residual remanent magnetic field, after application of the electric current, the intensity of which is sufficient to keep the passage 44 closed, a coercive excitation is applied temporarily to the coil 28 to demagnetize the magnetizable elements of the actuator by cancelling the remanent magnetic field.

The coercive excitation of demagnetization can consist, for example, in the application of an electric current that is reversed in relation to that which is applied to close the passage or of a logarithmically damped sinusoidal alternating electric current.

Thus, thanks to this procedure, a substantial amount of electrical power is saved since it is only consumed during the commands to open and close the passage 44. This procedure is implemented by an electrical power supply arrangement (not shown) connected electrically to the coil 28.

According to another possible embodiment of the invention, the fluidic actuator 12' shown in FIG. 6 differs from the actuator 12 described previously in two respects. Note that these two aspects are independent of each other, so they can be the object of different embodiments, but a single embodiment including these two aspects will now be described for the sake of brevity.

First of all, the deformable membrane 36 is replaced by a piston 36' that can be moved hermetically in the through hole 22 in the upper plate 20 as the movable element of the actuator 12'.

Then, the actuator 12' comprises two electromagnets 26A, 28A and 26B, 28B arranged on either side of the permanent magnet 24 so as to channel, between these two electromagnets 26A, 28A and 26B, 28B, the permanent magnetic field B1 generated by the permanent magnet 24 when the two electromagnets are supplied with electricity.

Specifically, on the inside of the enclosure 14, a cylindrical central core 26A is arranged on the base 16, centered about the axis D. The radius thereof is clearly less than the inside radius of the cylindrical side wall 18. This central core 26A is made, for example, of iron or steel, more generally of a soft ferromagnetic material, so as to guide the field lines in a direction parallel to the axis D. Around this central core 26A, a coil 28A extends between the outside surface of the central core 26A and the inside surface of the side wall 18, but without reaching it. The coil 28A is composed of an electrically conductive wire wound around the central core 26A to form a first electromagnet 26A, 28A with same.

Arranged on this first electromagnet 26A, 28A is the cylindrical permanent magnet 24 having the same radius as the central core 26A, also centered about the axis D.

Arranged on the permanent magnet 24 is another cylindrical central core 26B having the same radius, also centered about the axis D and extending along this axis up to the height H defined previously inside the enclosure 14. This central core 26B is, for example, like the central core 26A, made up of iron or steel, more generally of a soft ferromagnetic material, so as to guide the field lines in a direction parallel to the axis D. Around this central core 26B, a coil 28B extends between the outside surface of the central core 26B and the inside surface of the side wall 18, but without reaching same. The coil 28B is composed of an electrically conductive wire wound around the central core 26B to form the second electromagnet 26B, 28B with same.

The permanent magnet 24 thus generates the permanent magnetic field B1 the field lines of which can be guided by the central cores 26A and 26B, the upper plate 20, the side wall 18 and the base 16, whereas the electromagnets 26A, 28A and 26B, 28B are capable of generating, by electrical control, controlled magnetic fields B2A and B2B the field lines of which can also be guided by the central cores 26A and 26B, the upper plate 20, the side wall 18 and the base 16. In this second embodiment, it can be expected that the field lines will be channeled better between the two electromagnets when they a supplied with current than in the first embodiment.

From one of the actuators as described above, it is possible to design a display device having a deformable surface comprising a plurality of such actuators the movable elements of which are distributed on the deformable surface. These movable elements are, for example, distributed regularly in the manner of a matrix on the deformable surface of the display device.

A display device 50 implemented using actuators such as that in FIG. 1 is illustrated, for example, in exploded perspective in FIG. 7. It is assembled, for example, according to a multi-layer design (which is one of the possible methods of matrix assembly) by assembling the following elements:

a first rectangular plate 52, made up of iron or steel, more generally of a soft ferromagnetic material so as to guide the magnetic field lines, forming the set of bases 16 of the actuators of the display device 50, a rectangular frame 54 pierced by cylindrical through holes, made up of iron or steel, more generally of a soft ferromagnetic material so as to guide the magnetic field lines, forming the set of side walls 18 of the actuators of the display device 50, a second rectangular plate 56, made up of iron or steel, more generally of a soft ferromagnetic material so as to guide the magnetic field lines, forming the set of upper plates 20 of the actuators of the display device 50, a rectangular deformable membrane 58 disposed on the outside surface opposing the frame 54 of the second rectangular plate 56, and a third rectangular plate 60 the function of which is to keep the display device 50 together and to maintain the deformable membrane 58 hermetically under pressure against the second rectangular plate 56, all while permitting this membrane to deform locally through holes disposed regularly in the manner of a matrix on this third plate 60 in relation to the chambers arranged in the cylindrical through holes of the frame 54.

More specifically, the third rectangular plate 60 is, for example, equipped with rods disposed regularly on its surface and designed to pass through corresponding holes arranged in the plates 52, 56, the frame 54 and the membrane 58 to maintain it all under pressure. The pressure can be maintained by screwing if, for example, at least a portion of the rods is threaded and the dimensions of the device so permit, or using any other appropriate standard technique available to a person skilled in the art.

In this embodiment, the maintaining of the membrane 58 hermetically under pressure between the second and third plates 56 and 60, as well as the possible local deformation of this membrane 58 through each hole of the third plate 60 ensures both the tightness of the actuators and the presence of movable elements in contact with the magnetorheological fluid of each actuator.

Note that a permanent magnet 24, a central core 26 and a coil 28 are disposed on the inside of each cylindrical through hole drilled in the frame 54 to form the corresponding actuator.

FIG. 8 shows detail of the frame 54 viewed from the bottom. It illustrates an embodiment of a common network 62 of channels for supplying the chambers of the actuators with magnetorheological fluid under a predetermined adjustable pressure.

This network 62 of channels is cut into the bottom of the frame 54 and supplies each actuator chamber arranged in each cylindrical through hole drilled in the frame 54 with magnetorheological fluid. It is connected to side conduits 64 drilled in the side of the frame 54 to supply pressurized magnetorheological fluid.

FIG. 9 shows the display device 50 of FIG. 7 in an assembled position. By virtue of the technology used for the actuators, a compact device can be obtained, particularly having a thickness of less than 5 mm. Moreover, as a result of the small number of moving mechanical parts, the device is reliable.

Note that, although this display device and some of the elements of which it is composed have been presented as having a rectangular shape, it may, more generally, have any shape whatsoever.

Finally, FIG. 10 shows a schematic view of a portable device 70 equipped with a display device having a deformable surface such as that (50) shown in FIG. 9. The portable device 70, which is itself a display device by extension, is, for example, a telecommunications device, a personal digital assistant device or any other portable electronic device. In this case, an electronic circuit 72 for controlling the display device 50, associated therewith, can also be integrated into the portable device 70.

More specifically, this electronic circuit 72 is designed to individually control each electromagnet 26, 28 of each fluidic actuator 12 and to control, in a collective manner, the pressure of the magnetorheological fluid in the channels of the common network 62. An almost infinite number of configurations of the deformable surface and therefore of shapes on the screen of the portable device 70 can thus be obtained by adjusting the differential supply of the electromagnets and the pressure of the magnetorheological fluid used to modify the position of the movable element (deformable membrane or piston) of each fluidic actuator between a high position (maximum local deformation of the surface) and a low position (for example, locally flat surface) by passing through all of the intermediate positions between these two extreme positions.

As is also illustrated in a non-limiting manner for the sake of example, the map of a geographic area can thus be represented in relief on the deformable surface of the portable device 70, for example with its roads 74, selected itineraries 76, structural elements such as buildings 78, a current position indicator 80 and a destination position indicator 82.

Other applications are obviously possible, such as the dynamic display of touch buttons depending on the progression of a contextual menu or the display of images and videos in relief. These applications can be imagined in contexts including public display, accessibility for the handicapped, Braille screens, human-machine interfaces in the automobile sector, etc.

It is clear that an actuator such as one of those described above is simple in design and consumes little energy. The integration thereof into a display device having a deformable surface is therefore advantageous.

Also note that the invention is not limited to the embodiments described above. In fact, it will be clear to the person skilled in the art that various modifications can be made to the embodiments described above in light of the teaching that was just disclosed to him. Particularly, the electromagnets described above can be replaced by other equivalent technical means, i.e., those capable as they are of generating a non-permanent magnetic field on command.

In the claims that follow, the terms used must not be interpreted as limiting the claims to the embodiments outlined in the present description but should be interpreted as including all of the equivalents that the claims aim to cover based on the wording thereof and the provision of which is within the capabilities of a person skilled in the art in applying his general knowledge to the implementation of the teaching that was just disclosed to him.

The invention claimed is:

1. A fluidic actuator for a display device, comprising:
a chamber having walls and being filled with a fluid;
a central core;
a plate forming one of the walls of the chamber;
an element movable in relation to the chamber and in contact with the fluid; and
a passage for circulating the fluid between inside and outside of the chamber in order to vary an amount of fluid in the chamber, thus causing movement of the movable element, the passage extending between the central core and the plate,
wherein the fluid is magnetorheological and the fluidic actuator comprises means of magnetic field generation including said central core and arranged so as to generate, in the passage extending between the central core and the plate, a controlled magnetic field,
wherein the means of magnetic field generation controls an intensity of the magnetic field to open and/or close the passage extending between the central core and the plate, by acting on a viscosity of the magnetorheological fluid located in the passage, and
wherein the opening and/or closing of the passage controls the amount of fluid in the chamber and an amount of deformation or displacement of the movable element.

2. The fluidic actuator according to claim 1, wherein the means of magnetic field generation comprise an electromagnet, comprising an electric power supply device for the electromagnet, the electric power supply device being configured to:
temporarily provide, to a coil of the electromagnet, an electrical current of sufficient intensity to produce a magnetic field for saturation of magnetizable elements of the actuator, generating a residual remanent magnetic field which remains after application of the electrical current and an intensity of which is sufficient to keep the passage closed by acting on the viscosity of the magnetorheological fluid located in the passage, and
temporarily provide, to the coil of the electromagnet, a coercive excitation for the demagnetization of the magnetizable elements of the actuator by cancelling the residual remanent magnetic field.

3. The fluidic actuator according to claim 1, further comprising:
a permanent magnet generating, in the passage, a permanent magnetic field an intensity of which is sufficient to keep the passage closed by acting on the viscosity of the magnetorheological fluid located in the passage,
wherein the means of magnetic field generation are configured such that the controlled magnetic field at least partially offsets the effect of the permanent magnetic field when they are activated.

4. The fluidic actuator according to claim 3, further comprising:
two electromagnets arranged on either side of the permanent magnet so as to channel, between the two electromagnets, the permanent magnetic field generated by the permanent magnet when the two electromagnets are supplied with electricity.

5. The fluidic actuator according to claim 1, further comprising:
a plate with a through conduit and forming one of the walls of the chamber,
wherein the movable element comprises a piston movable in the conduit.

6. The fluidic actuator according to claim 1, further comprising:
a plate with a through conduit and forming one of the walls of the chamber,
wherein the movable element comprises a deformable membrane fixed hermetically to a surface of the plate opposing the inside of the chamber, the membrane covering the conduit.

7. A display device having a deformable surface, comprising:
a plurality of fluidic actuators according to claim 1, the movable elements of which are distributed, particularly regularly in the manner of a matrix, on the deformable surface.

8. The display device having a deformable surface according to claim 7, further comprising:
a display screen comprising a plate, the plate having a plurality of through conduits opposite of which the chambers filled with magnetorheological fluid of the fluidic actuators are arranged.

9. The display device having a deformable surface according to claim 7, further comprising:
a common network of channels to supply the chambers of the fluidic actuators with magnetorheological fluid under adjustable pressure.

10. The display device having a deformable surface according to claim 9, further comprising:
an electronic circuit for individually controlling each of the means of magnetic field generation of each fluidic actuator and for collectively controlling the pressure of the magnetorheological fluid in the channels of the common network.

* * * * *